United States Patent [19]

McLaughlin

[11] Patent Number: 5,788,265
[45] Date of Patent: Aug. 4, 1998

[54] TORSIONAL BUSHING SYSTEM

[75] Inventor: Ronald J. McLaughlin, Maumee, Ohio

[73] Assignee: The Pullman Company, Milan, Ohio

[21] Appl. No.: 706,603

[22] Filed: Sep. 5, 1996

[51] Int. Cl.[6] ............................................. B60G 11/22
[52] U.S. Cl. .................................... 280/717; 280/723
[58] Field of Search .............................. 280/717, 721, 280/723

[56] References Cited

U.S. PATENT DOCUMENTS

| | | | |
|---|---|---|---|
| 2,002,377 | 5/1935 | Mayne | 280/717 |
| 3,436,069 | 4/1969 | Henschen | 280/717 |
| 3,601,424 | 8/1971 | Badland | 280/717 |
| 3,687,479 | 8/1972 | Kober | 280/717 |
| 3,779,576 | 12/1973 | Malcolm | 280/717 |

FOREIGN PATENT DOCUMENTS

| | | | |
|---|---|---|---|
| 602953 | 8/1960 | Canada | 280/717 |
| 459445 | 9/1950 | Italy | 280/717 |
| 1390566 | 4/1975 | United Kingdom | 280/717 |

*Primary Examiner*—Kenneth R. Rice
*Attorney, Agent, or Firm*—Harness, Dickey & Pierce, PLC

[57] ABSTRACT

A torsional bushing system is provided and includes an elongated inner member that has disposed thereon a plurality of elastomer bushings of a generally square configuration. The assembly is inserted into a housing which is connected to a trailer, automobile or other vehicle. The end of the inner member is linked to a wheel assembly for the vehicle.

20 Claims, 3 Drawing Sheets

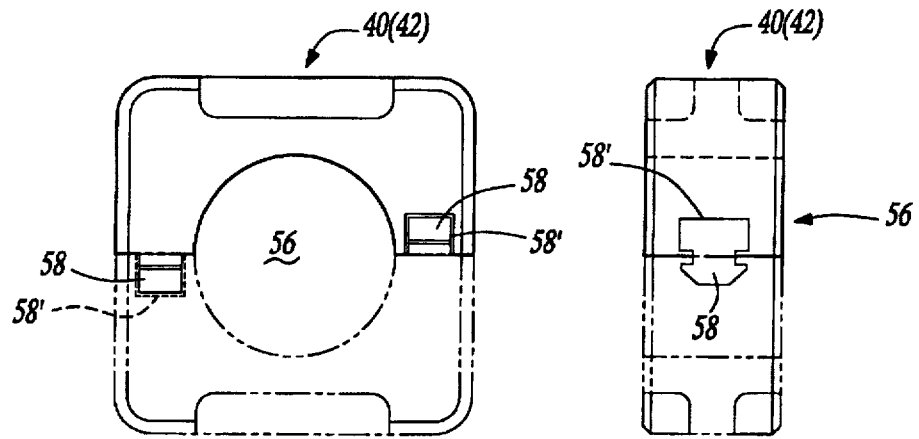
*Fig-6*  *Fig-7*
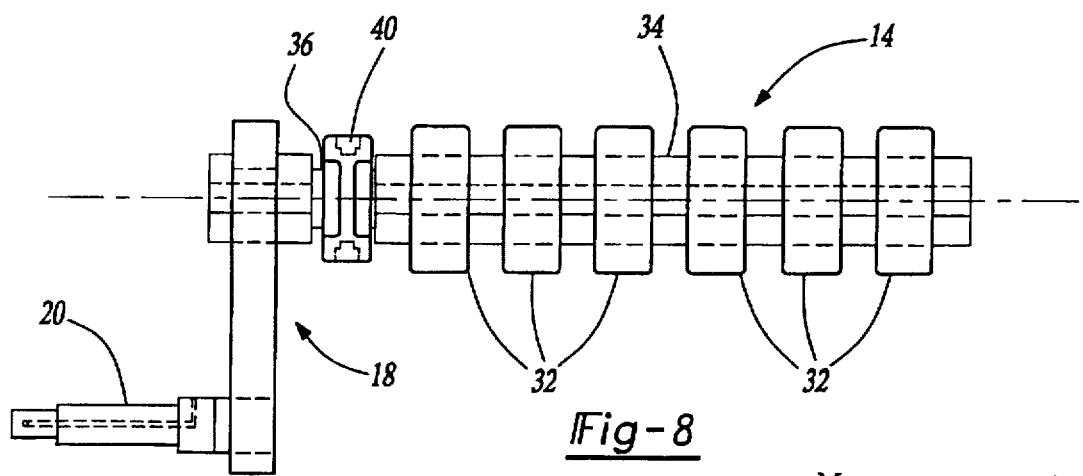
*Fig-8*
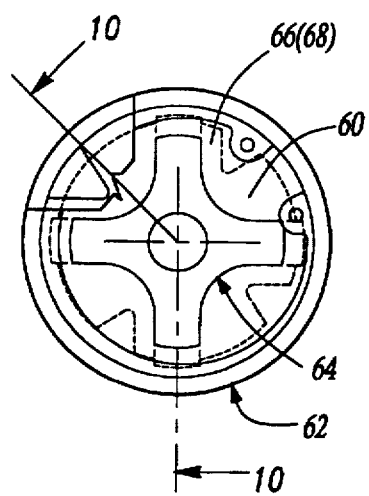
*Fig-9*
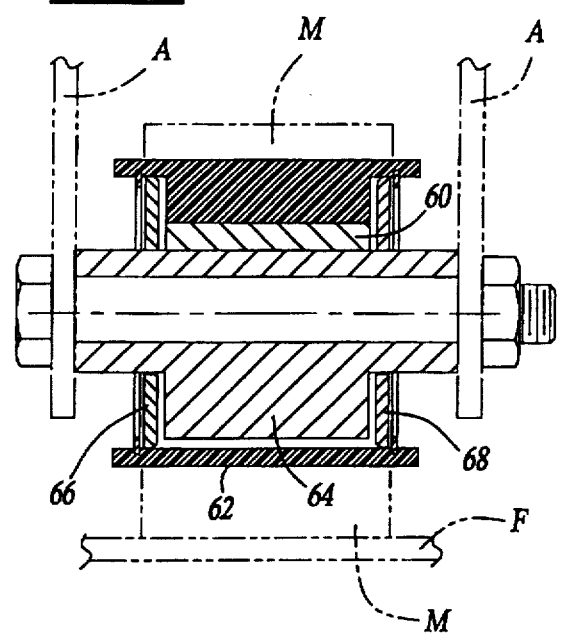
*Fig-10*

TORSIONAL BUSHING SYSTEM

BACKGROUND OF THE INVENTION

This invention relates to a torsional bushing system for use on trailers, automobiles and other vehicles. More particularly, the invention is directed to a system including an assembly comprising an elongated inner member that has disposed thereon a plurality of elastomer bushings. The assembly is inserted into a housing which is connected to the vehicle frame. The end of the inner member is then linked to a wheel assembly for the vehicle.

While the invention is particularly directed to the art of torsional bushings for use on trailers and automobiles, and will be thus described with specific reference thereto, it will be appreciated that the invention may have usefulness in other fields and other applications. For example, the invention may also be used in conjunction with materials handling vehicles, machinery, ... etc.

By way of background, trailers generally have single or multiple axle units and are pulled by conventional automobiles or light trucks. Most trailers are rated up to about a 7,000 pound capacity, which capacity increases with the use of additional axles. Hitches are used to attach the trailer to the frame, axle or rear of a towing vehicle.

Trailers traditionally have been built with steel leaf springs for the purpose of absorbing shock. These springs are fixed to the trailer frame and axles attached underneath. This method of shock absorbing is functional and relatively inexpensive. However, such a method also results in a suspension where a single axle transmits shock from one wheel to the other. This increases sway, effects tracking, and promotes instability. In addition, if the leaf springs are not sufficiently damped, it is possible that the trailer will reach a point of resonance. This resonance could cause a very uncomfortable ride, result in loss of control of the vehicle, and/or cause serious damage to the vehicle.

Because of the problems noted above and others, the trailer industry has resorted to using rubber torsional springs as a substitute for leaf springs. Torsional spring assemblies are particularly advantageous for users of trailers that haul more delicate items, e.g. boats, horses, snowmobiles ... etc. When using torsional bushings, trailers generally pull better, are not subject to resonant vibration, and provide a better overall ride.

A wide variety of torsional bushing arrangements are available. For example, one design comprises a straight rubber journal that is mold bonded to an inner metal tube. The journal is slipped into a square outer metal tube. In the system, there is limited interference between the metal and the rubber, resulting in little rubber compression. In fact, the shape of the rubber prohibits rubber compression. In this regard, this design relies on rubber working in shear. That is, as the lever arm attached to the inner metal rotates, the rubber is twisted, causing a shearing action within the rubber. The shearing force resists the rotation of the inner metal, resulting in a reaction to the applied load.

This design has disadvantages. First, rubber is weaker in shear than in compression. As a result, when shearing action is utilized, a larger volume of rubber is required to perform a function than if compression were utilized. Second, since shearing action is directly related to the surface of the inner metal, a large amount of metal is also required. Third, this design requires mold bonding, which is an expensive manufacturing process. Expense is also increased due to the large mass of metal in the inner tube, which must be brought to the molding temperature before the rubber is molded. Fourth, if the bushing fails—either through rubber tear or adhesive failure—the failure could result in loss of the axle or the wheel. Last, the rubber used can not be placed in compression inasmuch as the mass of the rubber would bulge the outer tube when assembled or in service. An immediate result of this limitation is that the rubber can slip out of the outer tube as easily as it slips in. The loss of a trailer wheel is possible unless an expensive retention system is employed.

Another design comprises the use of elastomer cylinders or cords that are assembled without adhesives between a square outer metal tube and a square inner metal tube. This system has an advantage over the previously described design inasmuch as the rubber that is used works in compression, not shear. Thus, less rubber is required to perform a similar function.

Disadvantages to this system include the following. First, there is a great deal of empty space between the outer tube and the inner tube. This space means that the rubber is placed in significant compression only when the inner tube is turned. Second, retention of the inner tube could be a problem. Third, this design permits water and road salts to accumulate in the axle, causing corrosion and eventual failure of the axle. Corrosion is a serious problem with boat trailers which are constantly subject to total immersion of the axle in water.

Another major limitation of the rubber cord design is the cost of the assembly. The rubber cords must be frozen before assembly, using liquid nitrogen. This significantly increases the cost of the system.

By way of further background, front wheel drive automobiles—while varying in design from model to model—typically use rear axles that include two trailing arms attached to the frame with pivoting bushings. The rear of the arm attaches to a rear spindle assembly. Two pairs of lateral links extend from the center of the vehicle frame to the wheel spindle assemblies. Single, large stampings are sometimes alternatively used. A steel spring is positioned above each wheel spindle for shock absorption. A shock absorber is also used to damp the wheel movement.

It would be advantageous to eliminate the need for the steel springs, complicated wheel spindle assemblies with trailing and lateral arms, excessive bushings, and the center frame support for the lateral arms or stampings. Elimination of these elements would, of course, reduce the cost of manufacture. Assembly and maintenance would also be simplified.

The present invention contemplates a new and improved torsional bushing system which resolves the above referenced difficulties and others.

SUMMARY OF THE INVENTION

A torsional bushing system for use in a vehicle, preferably a trailer or automobile, is provided. The system preferably comprises an elongated inner member, having a main portion of generally square cross-section and a generally cylindrical end portion. A plurality of square elastomer bushings are positioned on the main portion and a square outer housing surrounds the apparatus. A linkage arm is connected to the end portion of the inner member and a spindle for supporting a wheel assembly is connected thereto.

An advantage of the present invention is that the elastomer bushings work in compression, the most desirable use of elastomer material.

Another advantage of the present invention is that the elastomer bushings can be molded in free shape, a low cost manufacturing process.

Another advantage of the present invention is that the elastomer bushings can be bonded to the inner member at room temperature with an adhesive.

Another advantage of the present invention is that it is easily assembled into a trailer or automobile axle assembly.

Another advantage of the present invention is that the system is permanently sealed from penetration of road salts and moisture.

Another advantage of the present invention is that no welding or fasteners are required to retain the bushing assembly in the system.

Another advantage of the present invention is that the elastomer bushings require a high load in order to extract them from the axle assembly.

Another advantage of the present invention is that the elastomer bushings provide for easy adjustment of the load ratings of the system by adding or deleting bushings.

Another advantage of the present invention is that the mold cost and assembly equipment cost is relatively low.

Another advantage of the present invention is that, for automotive axles, the number of working parts is reduced.

Another advantage of the present invention is that, for automotive axles, the cost of an axle assembly is reduced.

Another advantage of the present invention is that, for automotive axles, the weight of an axle assembly is reduced.

Another advantage of the present invention is that, for some trailers, a steel spring is eliminated, thus reducing the weight.

Still further advantages of the present invention will become apparent to those of ordinary skill in the art of upon reading and understanding the following detailed description of the preferred embodiments.

BRIEF DESCRIPTION OF THE DRAWINGS

The present invention exists in the construction, arrangement, and combination of the parts of the device, whereby the objects contemplated are attained as hereinafter more fully set forth, specifically pointed out in the claims, and illustrated in the accompanying drawings in which:

FIG. 6 is a front elevational view of the end collar of FIG. 2;

FIG. 7 is a side elevational view of the end collar of FIG. 6;

FIG. 8 is side elevational view of the torsional bushing system of FIG. 1; and,

FIGS. 9–14 show an alternative embodiment of the invention.

DESCRIPTION OF THE PREFERRED EMBODIMENTS

Figure 1:
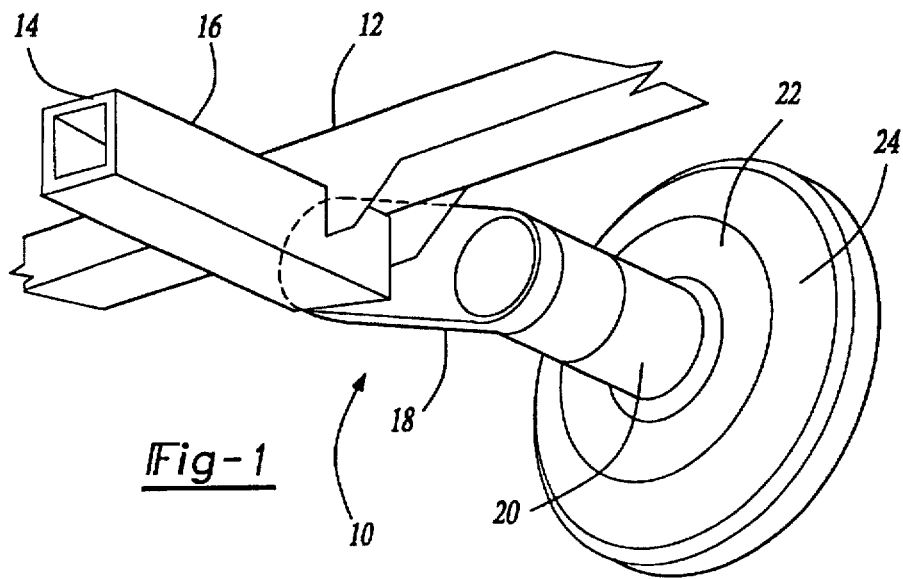
FIG. 1 is a partial perspective view of the preferred embodiment of the torsional bushing system of the present invention.

Referring now to the drawings wherein the showings are for purposes of illustrating the preferred embodiments of the invention only and not for purposes of limiting the same, FIG. 1 provides a view of the overall preferred embodiment. As shown, the torsional bushing system 10 attaches to a trailer or automobile (neither shown) having a frame 12 to provide shock absorbing functions to the vehicle. The system 10 is generally comprised of a torsional bushing assembly 14 encased in an outer housing 16, a linkage or activating arm 18, and a spindle 20. The spindle 20 has attached thereto a hub 22 supporting a tire 24. The housing 16, arm 18 and spindle 20 are preferably formed of metal; however, any sufficiently durable material will serve as a suitable alternative.

Figure 2:
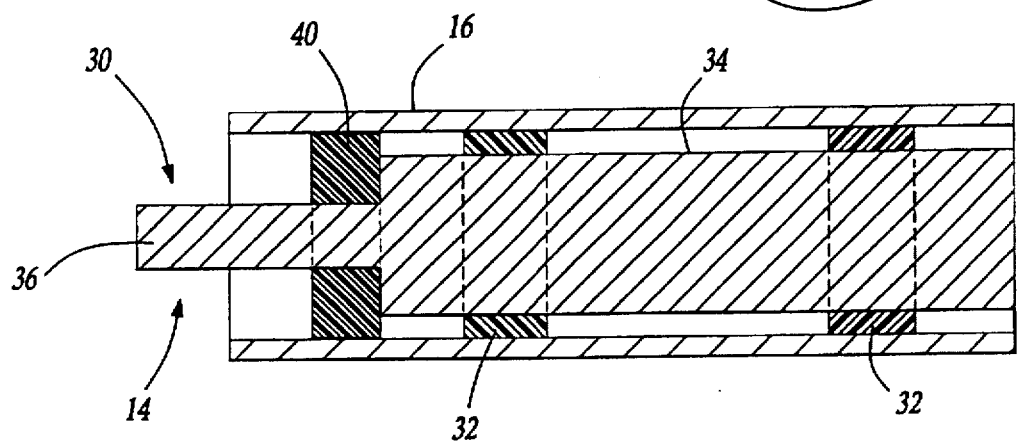
FIG. 2 is a partial cross-sectional view of the torsional bushing assembly of FIG. 1 inserted in a housing.

Referring more particularly to FIG. 2, the assembly 14 and the housing 16 are shown. The assembly 14 includes an elongated inner member 30 which supports elastomer bushings 32 on a main portion 34 thereof. The member 30 is preferably formed of metal and includes an end portion 36 which supports end collar 40. The end collar is preferably a plastic or rubber snap bushing that abuts the main portion 34. As an option, the collar 40 is retained in position by crimping the edge of the housing 16. Again, preferred materials are indicated but any suitable material may be utilized. It is to be recognized that an identical assembly 14 positioned within a housing 16 is provided for each wheel of the vehicle. Independent articulate of each assembly thus results.

Figure 3:
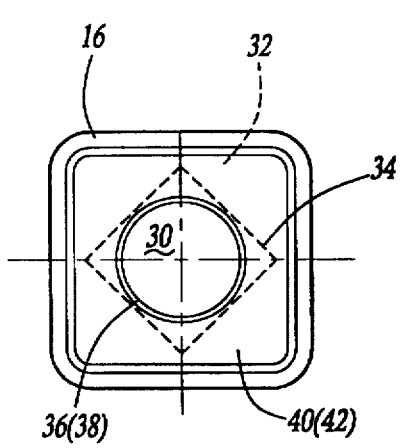
FIG. 3 is a side view of the device of FIG. 2.

Referring now to FIG. 3, it can be seen that the outer housing 16, the end collar 40, the bushings 32 (partially shown in phantom), and the main portion 34 (shown in phantom) of the member 30 are coextensive and are all generally square in cross-section. The end portion 36 is generally cylindrical in cross-section. It is to be appreciated that various shapes could be used in place of the preferred shapes.

Figures 4, 5:
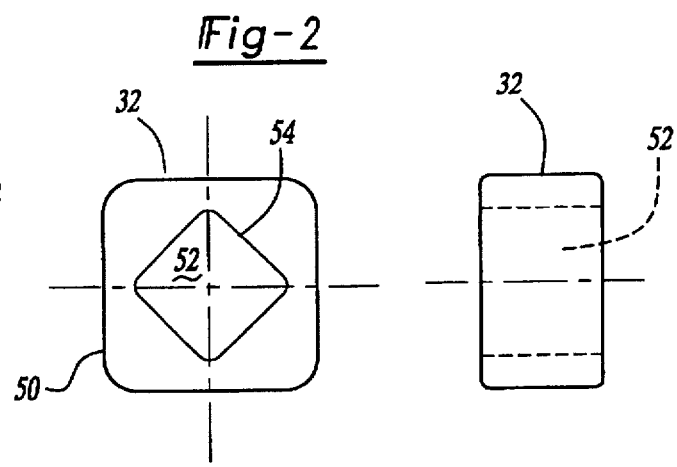
FIG. 4 is an elevational front view of a torsional bushing of FIG. 1.
FIG. 5 is an elevational side view of the bushing of FIG. 4.

As illustrated in FIG. 4, the bushings 32—one of which is shown but all being identical—have a generally square outer periphery with flat outer surfaces 50 and a square aperture 52 defined by flat inner surfaces 54 that correspond to the surfaces 50. The inner surfaces 54, however, are disposed at a preferred angle of 45 degrees relative to corresponding outer peripheral surfaces 50. Thus, the inner surfaces 54 are not parallel to the surfaces 50 but are offset therefrom. It is to be appreciated that the 45° offset angle could be any suitable angle e.g. 40° or 50°.

As shown in FIG. 5, the aperture 52 extends completely through the bushing 32. In addition, the aperture 52 is sized to snugly fit and receive the main portion 34 of the member 30.

FIGS. 6 and 7 show the configuration of a snap bushing that serves as the end collar 40. As shown, the collar is generally square in cross-section and includes a cylindrical aperture 56 which is sized to receive the end portion 36 of the inner member. It is to be appreciated that the device of FIGS. 6 and 7 is actually two halves—one of which is shown in phantom in FIGS. 6 and 7—that mate with one another via snap members 58 and 58' to form the complete snap bushing.

FIG. 8 provides a view of the torsional bushing assembly 14—having the bushings 32 equally spaced thereon—connected to the linkage arm 18 and spindle 20. This system is conveniently inserted into a housing 16 (not shown) which is attached to a vehicle frame 12 by any suitable known manner.

The manufacturing and assembly process is as follows. First, the bushings 32 are molded into free rubber to have a square outer shape sized to be inserted into the housing 16 and a square aperture 52 sized to receive inner member 30.

Preferably, an elastomer compound comprising natural rubber and other additives is used. Second, the linkage arm 18 is then rigidly attached to the member 30 by welding or other known connecting techniques. Third, the spindle 20 is then attached to the arm 18 in a fashion to facilitate rotation of the subsequently attached hub 22 and the supported tire 24. Fourth, the elastomer bushings 32 are then bonded onto the main portion 34 of the inner member 30 with an adhesive at room temperature. The number of bushings used, the spacing thereof, and the precise formulation of the compound used to form the bushings may be varied depending on desired performance characteristics. In addition, any suitable adhesive may be used or, alternatively, the bushings could simply be friction fit onto the member 30. Fifth, the end collar or snap bushing 40 is assembled onto the end portion 36.

Sixth, the inner member 30, having the bushings 32 attached thereto and the end collar 40 positioned thereon, is inserted into the outer housing 16, which is typically a part of the frame 12 of the vehicle. As an option, the edges of the housing 16 adjacent the collars are crimped to retain the collars in position. This crimping arrangement further secures the sealed chamber now surrounding the bushings.

In operation, as the tire is subjected to the force and shock of the road, the spindle 20 and the linkage arm 18 suitably rotate the member 30 so that the member 30 transfers the force or shock to the inner surfaces 54 of the bushings. The bushings are then compressed between the member 30 and the housing 16. As the force or shock increases so does the compression of the bushings. Thus, the bushing arrangement absorbs the force and shock of the road.

The advantages of the present invention include the following:

1) the elastomer bushings work in compression, the most desirable use of elastomer;
2) the elastomer bushings can be molded in free shape, a low cost manufacturing process;
3) the elastomer bushings can be bonded to the inner member at room temperature with an adhesive;
4) the assembly is easily assembled into a vehicle axle assembly or housing;
5) the system is permanently sealed from penetration of road salts and moisture;
6) no welding or fasteners are required to retain the bushing assembly in the system;
7) the elastomer bushings, once installed, require a high load in order to extract the bushings from the axle assembly;
8) the elastomer bushings provide for easy adjustment of the load ratings of the system by adding or deleting bushings;
9) the mold cost and assembly equipment cost is relatively low;
10) in automotive axle assemblies, the number of working parts is reduced, the cost is reduced, and the weight is reduced; and,
11) in some trailer axle assemblies, the steel spring is eliminated so the weight is reduced.

In another embodiment, elastomer bushings 60 of cruciform shape are used in connection with similar torsional bushing arrangements, as exemplary shown in FIGS. 9 and 10. This type of arrangement may be used, for example, in connection with control or actuating arms of automobiles whereby a forked arm A is attached to both ends of an inner member 64 and a housing 62 is attached to the automobile frame F by mounting bracket M.

It is noted that FIG. 10 shows a configuration whereby only one bushing 60 is provided; however, as with the preferred embodiment, any number of bushing can be provided to an assembly depending on the desired configuration. The device of FIGS. 9–10 results in certain improved performance characteristics but uses nonstandard configurations that affect manufacturing and cost thereof.

Figure 11:
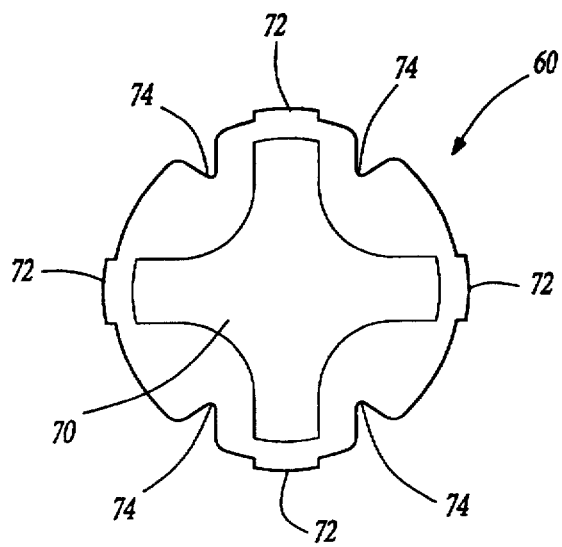
Figure 12:
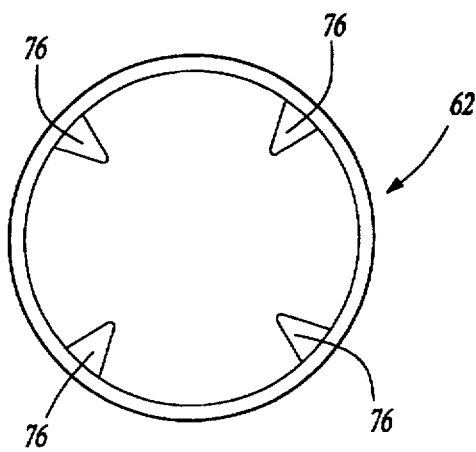
Figure 13:
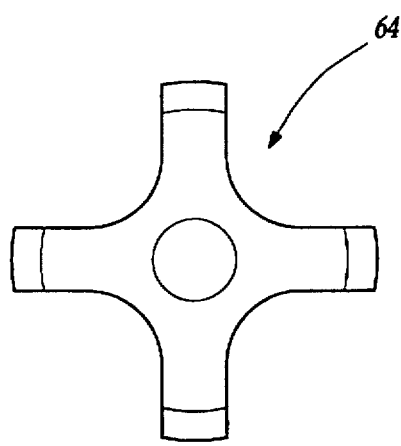
Figure 14:
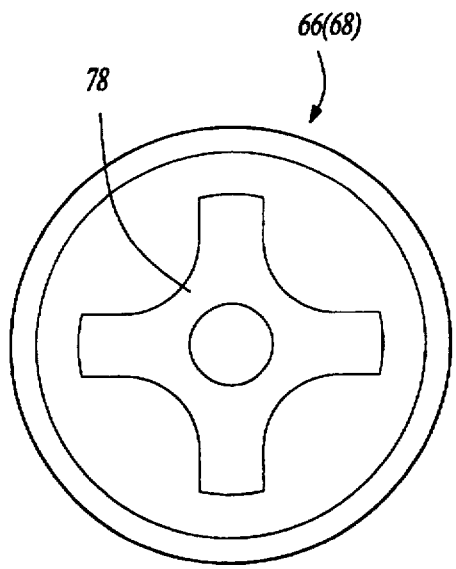

For example, the housing, the inner member and the end collars are adapted to accommodate the bushing 60. With continuing reference to FIGS. 9–10 and as shown more specifically in FIG. 11, the bushing 60 has a cruciform-shaped aperture 70 and protrusions 72 and indentations 74 spaced on its generally cylindrical periphery. In FIG. 12, an outer housing 62 having protrusions 76 on its generally cylindrical inner surface is shown. The protrusions 76 are received in the indentations 74 when the device is assembled. In FIG. 13, an inner member 64 of cruciform shape is illustrated, such inner member being received in the aperture 70 of the bushing 60 and connected, or bonded, thereto. FIG. 14 to and adapted to receive the member 64.

As with the preferred embodiment, the outer housing and inner member are preferably formed of metal, but any suitable material will suffice. In addition, the bushing is formed—using any of a variety of techniques—of an elastomer comprising natural rubber and other additives while the end collars are formed of plastic. Again, alterative materials may be used.

In operation, this embodiment generally performs as does the embodiment shown in FIGS. 1–8. That is, as shock and force are experienced, the member 64 is rotated so that such force or shock is transferred to and absorbed by the bushing 60. Because of the cruciform shapes used, though, the shock absorbing is improved.

The cruciform configuration may also be used as a replacement to the configuration described with respect to FIGS. 1–8. Modifications such as changing the shape of the inner member and outer housing would need to be made in order to accomplish such a replacement. It is appreciated that other changes apparent to those skilled in the art may also be required.

The above description merely provides a disclosure of particular embodiments of the invention and is not intended for the purpose of limiting the same thereto. As such, the invention is not limited to only the above described embodiments. Rather, it is recognized the one skilled in the art could conceive alternative embodiments falling within the scope of the invention.

Having thus described the invention, I now claim:

1. A torsional bushing assembly for use in a vehicle, the assembly comprising:

a housing having a generally square cross-section;

an elongated inner member disposed within the housing and having a main portion of generally square cross-section and a generally cylindrical end portion; and, a plurality of bushings disposed between the housing and the main portion of the inner member, the bushings having a continuous generally square outer periphery with outer peripheral surfaces sealingly engaging the housing and a generally square aperture with corresponding inner surfaces defined therein sealingly engaging the main portion of the inner member, each outer peripheral surface being disposed at an angle of 45 degrees relative to a corresponding inner surface, adjacent bushings defining a sealed chamber located between the adjacent bushings.

2. The assembly as set forth in claim 1 wherein the end portion is adapted to be connected to a linkage arm connected to a spindle for supporting a hub and a tire.

3. The assembly as set forth in claim 1 wherein the plurality of bushings are bonded to the main portion.

4. The assembly as set forth in claim 1 wherein the plurality of bushings are equally spaced along the main portion.

5. The assembly as set forth in claim 1 wherein the bushings are formed of an elastomer material.

6. The assembly as set forth in claim 1 wherein the inner member is formed of metal.

7. The assembly as set forth in claim 1 wherein the housing is formed of metal.

8. The assembly as set forth in claim 1 further comprising a snap bushing positioned on the end portion within the housing.

9. A torsional bushing assembly for use in a vehicle. The assembly comprising:

a housing;

an elongated inner member disposed within the housing and having a main portion of generally square cross-section and a generally cylindrical end portion;

a plurality of bushings disposed between the housing and the main portion of the inner member, the bushings having a generally square outer periphery with outer peripheral surfaces and a generally square aperture with corresponding inner surfaces define therein to deceive the main portion of the inner member, each outer peripheral surface being disposed at an angle of 45 degrees relative to a corresponding inner surface; and a snap bushing disposed within the housing and positioned on the end portion of the inner member.

10. The torsional bushing assembly as set forth in claim 9 further comprising:

a linkage arm connected to the end portion of the inner member; and a spindle connected to the linkage arm, said spindle being adapted to support a hub and tire assembly.

11. A torsional bushing system for use in a vehicle, the system comprising:

a housing having a generally square cross-section;

an elongated inner member disposed within the housing and having a main portion of generally square cross-section and a generally cylindrical end portion;

a plurality of bushings disposed between the housing and the main portion of the inner member, the bushings having a continuous generally square outer periphery with outer peripheral surfaces sealingly engaging the housing and a generally square aperture with corresponding inner surfaces defined therein sealingly engaging the main portion of the inner member, each outer peripheral surface being disposed at an angle of 45 degrees relative to a corresponding inner surface adjacent bushings defining a sealed chamber located between the adjacent bushings;

a linkage arm connected to the end portion; and, a spindle connected to the linkage arm adapted to support a hub and tire assembly.

12. The system as set forth in claim 11 wherein the plurality of bushings are bonded to the main portion.

13. The system as set forth in claim 11 wherein the plurality of bushings are equally spaced along the main portion.

14. The system as set forth in claim 11 wherein the bushings are formed of an elastomer material.

15. The system as set forth in claim 11 wherein the inner member is formed of metal.

16. The system as set forth in claim 11 wherein the housing is formed of metal.

17. The system as set forth in claim 11 further comprising a snap bushing positioned on the end portion within the housing.

18. A torsional bushing assembly for use in a vehicle, the assembly comprising:

a generally cylindrical housing;

an elongated inner member disposed within said housing and having a main portion of generally cruciform cross-section and first and second ends; and a bushing disposed between the housing and the main portion of the inner member, the bushing having a continuous generally cylindrical outer peripheral surface sealingly engaging the housing and a generally cruciform shaped aperture defined therein sealingly engaging the main portion of the inner member.

19. The assembly as set forth in claim 18 wherein the bushing includes at least one indentation and the housing includes at least one Protrusion disposed within said at least one indentation.

20. The assembly as set forth in claim 18 wherein the bushing is formed of an elastomer material.

* * * * *